United States Patent [19]
Hirai et al.

[11] Patent Number: 5,381,261
[45] Date of Patent: Jan. 10, 1995

[54] OPTICAL ISOLATOR

[75] Inventors: Shigeru Hirai; Youichi Ishiguro; Yasuji Hattori; Masayuki Nishimura; Masayuki Shigematsu; Minoru Watanabe; Kouji Nakazato, all of Yokohama, Japan

[73] Assignee: Sumitomo Electric Industries, Ltd., Osaka, Japan

[21] Appl. No.: 937,896

[22] PCT Filed: Feb. 19, 1992

[86] PCT No.: PCT/JP92/00171
§ 371 Date: Nov. 5, 1992
§ 102(e) Date: Nov. 5, 1992

[87] PCT Pub. No.: WO92/15040
PCT Pub. Date: Sep. 3, 1992

[30] Foreign Application Priority Data

Feb. 20, 1991 [JP] Japan ................. 3-026231
Feb. 20, 1991 [JP] Japan ................. 3-026232
Feb. 20, 1991 [JP] Japan ................. 3-026233

[51] Int. Cl.$^6$ ............................. G02B 5/30
[52] U.S. Cl. ..................... 359/282; 359/484; 359/497; 372/703
[58] Field of Search ............. 359/281, 282, 283, 484, 359/494, 495, 497, 499; 372/703

[56] References Cited

U.S. PATENT DOCUMENTS 4,239,329 12/1980 Matsumoto .
4,974,944 12/1990 Chang ................. 359/484
5,151,955 9/1992 Ohta et al. ............ 359/281

FOREIGN PATENT DOCUMENTS 0279412 8/1988 European Pat. Off. .
0352002 7/1989 European Pat. Off. .
0489315 6/1992 European Pat. Off. .
58-28561 6/1983 Japan .
1-287528 11/1989 Japan ................. 359/484
0044310 2/1990 Japan ................. 372/703
2-46419 2/1990 Japan .
2138715 11/1990 Japan .

OTHER PUBLICATIONS

Chang et al.; "High-Performance Single-Mode Fiber Polarization-Independent Isolators"; Optics Letters; vol. 15, No. 8; Apr. 15, 1990.
Chang et al.; "Polarization Independent Isolator Using Spatial Walkoff Polarizers"; IEEE Photonics Technology Letters; vol. 1, No. 3; Mar. 1989.

*Primary Examiner*—Ricky D. Shafer
*Attorney, Agent, or Firm*—Sandler, Greenblum & Bernstein

[57] ABSTRACT

An optical isolator not dependent on the plane of polarization of an incident beam and does not allow the plane of polarization to change on the outgoing side. The optical isolator comprises a first parallel flat double refractive crystal substance; a first Faraday rotor for rotating the plane of polarization of a beam; a second parallel flat double refractive crystal substance; a second Faraday rotor for rotating the plane of polarization in a direction opposite to that in which said first Faraday rotor rotates the plane of polarization; a third parallel flat double refractive substance; a fourth parallel flat double refractive substance; and permanent magnets for magnetizing the Faraday rotor and second Faraday rotors. Since a pair of Faraday rotors for rotating the plane of polarization in opposite directions, the plane of polarization on the incident side does not change on the outgoing side.

1 Claim, 16 Drawing Sheets

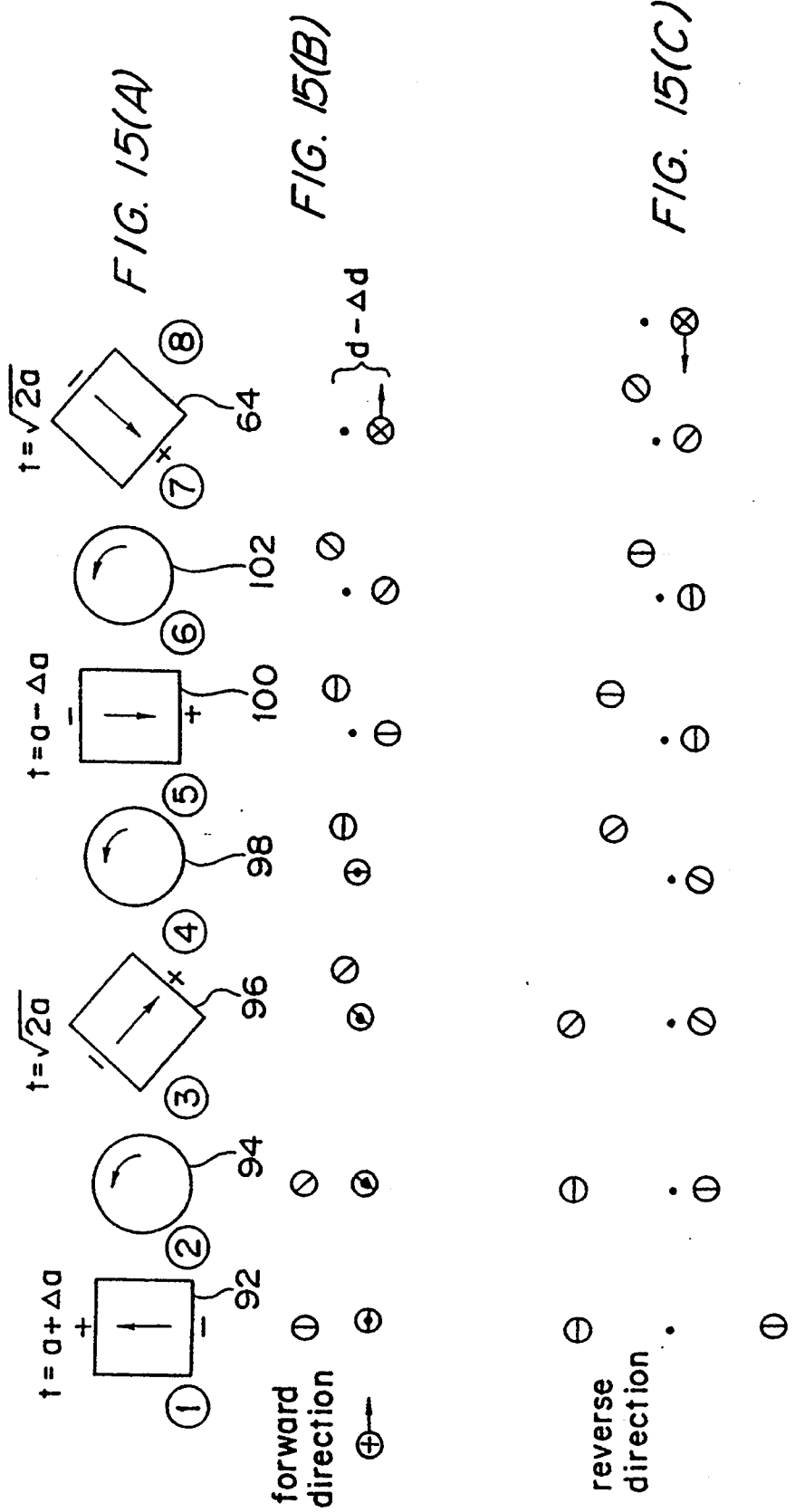

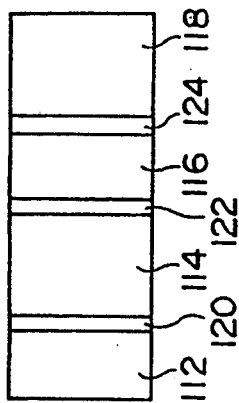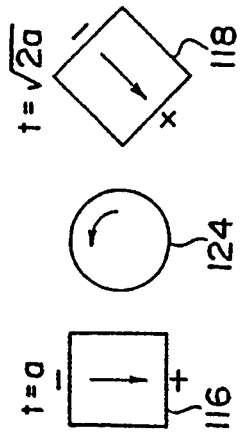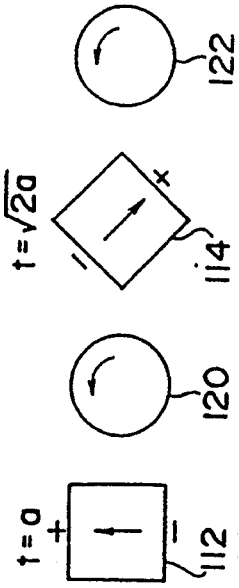

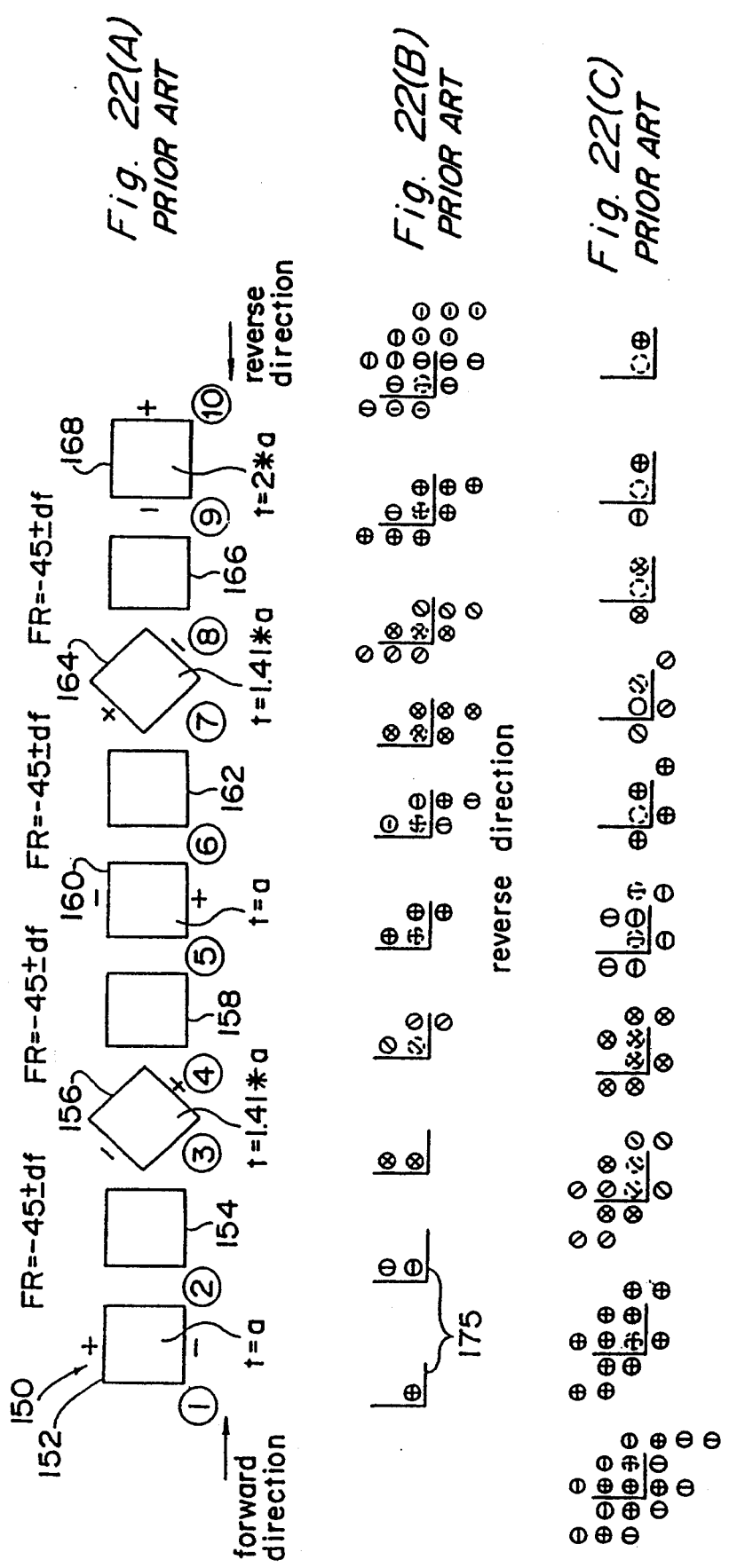

OPTICAL ISOLATOR

DETAILED DESCRIPTION OF THE INVENTION

1. Applicable Field of Invention

The present invention relates to an optical isolator for obstructing reflected light in the input/output of an optical system such as a fiber optic communication or an optical disk which uses a semiconductor laser and more particularly to an isolator which is not influenced by incident light and not sensitive to the change in temperature or to the fluctuation in the wavelength of light.

2. Conventional Art

It is known that in the semiconductor laser which serves as a main light source in the input/output of the fiber optic communication and the optical disk, the oscillation thereof becomes unstable in response to beams reflected by the optical system such as the end surface of an optical fiber, the connection point between optical fibers, a connecting lens or an optical connector and as a result, operation characteristic becomes deteriorated greatly, i.e., noise increases, the output fluctuates or the like. In order to solve the unstable operation performance of the semiconductor laser and achieve a stable light source to be used for an optical communication, various optical isolators have been developed.

An optical isolator comprising a Rochon prism used as a polarizer and an analyzer; Faraday rotors made of YIG (yttrium iron garnet) monocrystal or Bi-replaced garnet; and an annular permanent magnet consisting of such as SmCo for magnetizing the Faraday rotors in the forward direction is widely known. The optical isolator having such a construction has a disadvantage that only a certain plane of polarization is effective and a beam, not coincident with the polarization direction of the optical isolator, which has been incident on the optical isolator is greatly lost. If the optical isolator is used by inserting it between optical fibers, an optical isolator not dependent on polarized beams is preferable because the linear polarization is not maintained in optical beams which transmit the optical fibers.

In this situation, as a construction displaying isolation effect for all planes of polarization without being dependent on a certain polarization direction, an optical isolator of polarization-undependent type utilizing the separation/synthesis of ordinary beams and extraordinary beams by means of not a Rochon prism but a flat double refractive crystal such as calcite has been proposed. For example, according to an optical isolator proposed by Mr. Matsumoto in Japanese Patent Laid-Open Publication No. 55-22729, it comprises a lens, a first flat double refractive crystal, one magnetic optical material (Faraday rotor), optical rotatoty crystal (or anisotropic crystal), and a second flat double refractive crystal arranged in a row in the order from the incident side and a permanent magnet for magnetizing a magnetic optical material.

But the optical isolator having the conventional construction as disclosed in Japanese Patent Laid-Open Publication No. 55-22729 has a great disadvantage that it is sensitive to the change in temperature and the fluctuation in the wavelength of light and thus many reflected beams from the backward direction pass through the incident point. Some constructions for eliminating such a disadvantage have been proposed. For example, a shown in FIG. 22, an optical isolator 150 proposed by Mr. Chang in European Patent Publication No. 0352002 comprises five flat double refractive crystals (anisotropic crystals) 152, 156, 160, 164, and 168; four Faraday rotors (irreversible rotors) 154, 158, 162, and 166 each disposed between adjacent parallel flat double refractive crystals. The direction (walk-off direction) of the optical axis of each of the second, third, fourth, and fifth flat double refractive crystals 156, 160, 164, and 168 has an angle of 135°, 180°, 315°, and 90° with respect to the optical axis of the first flat double refractive crystal 152 and the four Faraday rotors 154, 158, 162, and 166 rotate the polarization plane by 45° in the same direction. The thickness of the first through the fifth flat double refractive crystal is set at the ratio of 1:1.41:1:1.41:2.

It is described in the specification of the above invention that owing to the angle of the rotation of the Faraday rotors and the direction and thickness of the flat double refractive crystal, beams transmitting in the backward direction to the forward direction are separated from each other and the number thereof is reduced without being affected by the change in temperature and the fluctuation in the wavelength of light.

Problems to be Solved by the Invention

However, in the optical isolator having the conventional construction as shown in FIG. 22, since an incident beam and an outgoing beam in the forward direction are distant from each other in a comparatively large degree with respect to the same line, the adjusting range becomes wide in adjusting the axis of a collimating lens and that of a single mode optical fiber in connecting them to an optical isolator. Thus, it is uneasy and takes time to assemble them.

Means for Solving the Problems

In view of the above-described problems, it is an object of the present invention to provide an optical isolator undependent on the plane of polarization of an incident light and does not allow the plane of polarization to change (rotate) on the outgoing side thereof.

In view of the above-described problems, it is another object of the present invention to provide an optical isolator undependent on the plane of polarization of an incident light, unsensitive to the change in temperature and the fluctuation in the wavelength of light, and an incident beam and an outgoing beam in the forward direction are coincident with the same line.

In view of the above-described problems, it is still another object of the present invention to provide an optical isolator capable of approaching a beam which has left the optical isolator to the extension line of an incident beam when the optical isolator has an inclination with respect to a line perpendicular to the direction of the incident beam so that the axis-adjusting range of a collimating lens and an optical fiber can be reduced.

In order to achieve the above-described objects, there is provided an optical isolator comprising: a first parallel flat double refractive crystal substance having a crystal optical axis inclining with respect to the surface thereof; a first Faraday rotor for rotating the plane of polarization of a beam; a second parallel flat double refractive crystal substance having a thickness $\sqrt{2}$ times as thick as the first parallel flat double refractive substance and having a crystal optical axis rotated by 135° with respect to an axis perpendicular to a parallel flat surface thereof; a second Faraday rotor for rotating the plane of polarization in a direction opposite to that in which the first Faraday rotor rotates the plane of polarization; a third parallel flat double refractive substance as thick as the first parallel flat double refractive substance and having a crystal optical axis rotated by 90° about an axis perpendicular to a parallel flat surface thereof; and permanent magnets for magnetizing the first Faraday rotor and second Faraday rotor. The present invention having the above-described construction comprises the second Faraday rotor, for rotating the plane of polarization, which is magnetized in the orientation reverse to that of the first Faraday rotor. Therefore, when the plane of polarization of an incident beam is rotated by 45° by the action of the first Faraday rotor, the plane of polarization is returned to the original state because the second Faraday rotor disposed at the subsequent stage rotates the plane of polarization by −45°. Accordingly, the plane of polarization of the incident beam is not substantially rotated on the outgoing side and thus the plane of polarization can be maintained.

In order to achieve the above-described objects, there is provided an optical isolator comprising: a first parallel flat double refractive substance having a crystal optical axis inclining with respect to the surface thereof; a first Faraday rotor for rotating the plane of polarization of a beam; a second parallel flat double refractive substance having a thickness $\sqrt{2}$ times as thick as the first parallel flat double refractive substance and having a crystal optical axis rotated by 135° with respect to an axis perpendicular to a parallel flat surface thereof; a second Faraday rotor for rotating the plane of polarization in the same direction as that in which the first Faraday rotor rotates the plane of polarization; a third parallel flat double refractive substance having a thickness two times as great as the thickness of the first parallel flat double refractive substance and having a crystal optical axis rotated by 270° about an axis perpendicular to a parallel flat surface thereof; a third Faraday rotor for rotating the plane of polarization in a direction reverse to that in which the second Faraday rotor rotates the plane of polarization; a fourth parallel flat double refractive substance having the same thickness as the thickness of the second parallel flat double refractive substance and having a crystal optical axis in the same direction as that of the second parallel flat double refractive substance; a fourth Faraday rotor for rotating the plane of polarization in the same direction as that in which the third Faraday rotor rotates the plane of polarization; a fifth parallel flat double refractive substance having the same thickness as that of the first parallel flat double refractive substance and having a crystal optical axis in the same direction as that of the first parallel flat double refractive substance; and a plurality of permanent magnets for magnetizing the first Faraday rotor through the fourth Faraday rotor. According to the present invention having the above-described construction, a pair of Faraday rotors magnetized in the forward direction rotate the plane of polarization; another pair of Faraday rotors magnetized in the backward direction rotate the plane of polarization; the thickness of each of the parallel flat double refractive crystals is set at the ratio of $1:\sqrt{2}:2:\sqrt{2}:1$; and the direction of the optical axis of each double refractive substance is 0°, 135°, 270°, 135°, and 0°. Thus, the incident beam and the outgoing beam both in the forward direction are coincident with each other on the same line.

In order to achieve the above-described objects, there is provided an optical isolator comprising two or more parallel flat double refractive substances each having a crystal optical axis which is in the same direction and reverse to each other in the orientation thereof; a plurality of Faraday rotors; and a plurality of magnets, wherein the thickness of given two parallel flat double refractive substances is changed by $\Delta a$ and $-\Delta a$, respectively so that the orbit of an incident beam which has left the optical isolator is deviated by $\Delta d$ in the axial direction of the incident beam. As a preferable modification of the present invention, there is provided an optical isolator comprising a plurality of parallel flat double refractive substances; a plurality of Faraday rotors; and a plurality of magnets, wherein the thickness of a first parallel flat double refractive substance is changed by $-\Delta a$ and a second parallel flat double refractive substance having a thickness of $\Delta a$ is additionally provided so that the crystal optical axis of the second parallel flat double refractive substance is in the same direction and reverse to the orientation of the first parallel flat double refractive substance. According to the present invention having the above-described construction, two parallel flat double refractive substances each having a crystal optical axis which is in the same direction and reverse to each other in the orientation thereof or the thickness of one of the parallel flat double refractive substances is changed by $-\Delta a$ and another parallel flat double refractive substances having a thickness of $\Delta a$ is additionally provided so that both parallel flat double refractive substances have a crystal optical axis which is in the same direction and reverse to each other in the orientation thereof. Therefore, the orbit of the beam which has left the optical isolator can be changed by $\Delta d$ in the axial direction of the incident beam. Accordingly, the orbit of the beam which has left the optical isolator can be allowed to be coincident with the axial direction of the incident beam by setting $\Delta a$ and $-\Delta a$ to an appropriate value according to the inclination of the optical isolator.

BRIEF DESCRIPTION OF THE DRAWINGS

FIG. 13A is a concept view showing the directions of crystal optical axes and the rotational directions of plane of polarizations in the optical isolator of FIG. 12 and FIGS. 13B and 13C are concept views showing the orbits obtained by viewing the propagation state of an incident beam in the direction of the beam;

FIG. 15A is a concept view showing the directions of crystal optical axes and the rotational directions of plane of polarizations in the optical isolator of FIG. 14 and FIGS. 15B and 15C are concept views showing the orbits (B) and (C) obtained by viewing the propagation state of an incident beam in the direction of the incident beam;

FIG. 21A is a concept view showing the detailed construction of the optical isolator of FIG. 20;

FIG. 21B is a concept view showing crystal optical direction and rotation direction of planes of polarization; and FIGS. 21C and 21D are concept views showing the orbits of an incident beam obtained by viewing the propagation state of the incident beam in the direction of the incident beam;

FIG. 22A–22C is a concept view showing the propagation state of an incident beam in a conventional optical isolator.

EMBODIMENT

The embodiments of the present invention will be described in detail below with reference to the drawings.

First Embodiment

A first embodiment of the present invention is shown in FIGS. 1 through 7.

Figure 1:
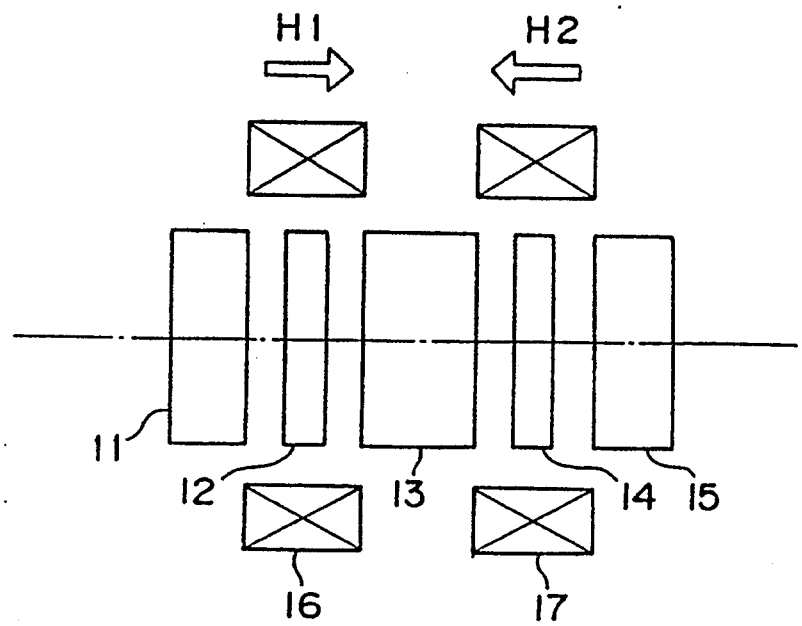
FIG. 1 is a view showing the schematic construction of an optical isolator according to a first embodiment of the present invention.

FIG. 1 shows a schematic construction of an optical isolator according to the first embodiment of the present invention. The optical isolator comprises a first parallel flat double refractive crystal 11; a first Faraday rotor 12; a second parallel flat double refractive crystal 13; a second Faraday rotor 14; and a third parallel flat double refractive crystal 15 arranged in this order along the incident direction of an incident beam, and also comprises permanent magnets 16 and 17 for magnetizing the Faraday rotors 12 and 14 in directions different from each other. As the parallel flat double refractive crystals 11, 13, and 15, various double refractive crystal substances such as a calcite plate or rutile can be utilized. As the Faraday rotors 12 and 14, various magnetic optical materials such as YIG (yttrium iron garnet) monocrystal, Bi-replaced garnet and RIG (rare-earth iron garnet) can be utilized. As the permanent magnets 16 and 17, an annular permanent magnet consisting of such as SmCo can be utilized.

Figure 2:
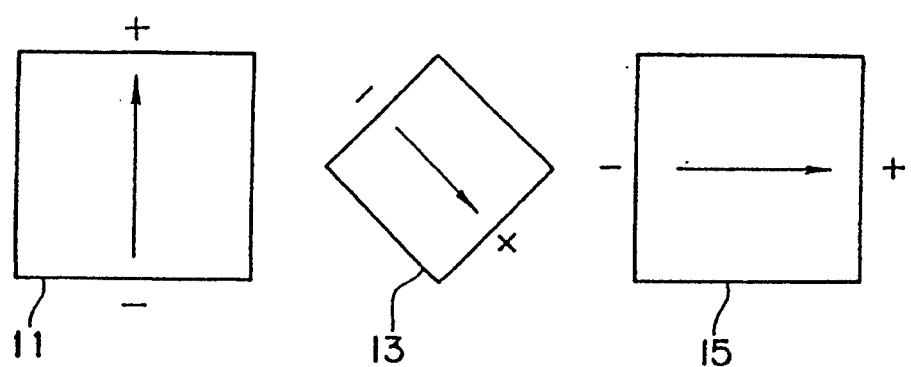
FIG. 2 is an explanatory view showing the directions of the optical axes of double refractive crystals shown in FIG. 1.

The optical axis of the first parallel flat double refractive crystal 11 inclines approximately 45° with respect to the surface thereof. The second parallel flat double refractive crystal 13 is $\sqrt{2}$ times as thick as the first parallel flat double refractive crystal 11 and has an optical axis rotated by 135° with respect to an axis perpendicular its parallel flat surface. The third parallel flat double refractive crystal 15 is as thick as the first parallel flat double refractive crystal 11 and has an optical axis rotated by 90° with respect to an axis perpendicular to its parallel flat surface. FIG. 2 shows the orientation of the optical axis of each parallel flat double refractive crystal projected on the parallel flat plate. The first Faraday rotor 12 rotates the plane of polarization of the incident beam by 45° while the second Faraday rotor 14 rotates the plane of polarization by −45° in the direction reverse to the direction in which the first Faraday rotor 12 rotates the plane of polarization. Consequently, the magnetization directions of the permanent magnets 16 and 17 are in directions opposite to each other as shown by H1 and H2 of FIG. 1.

Figure 3:
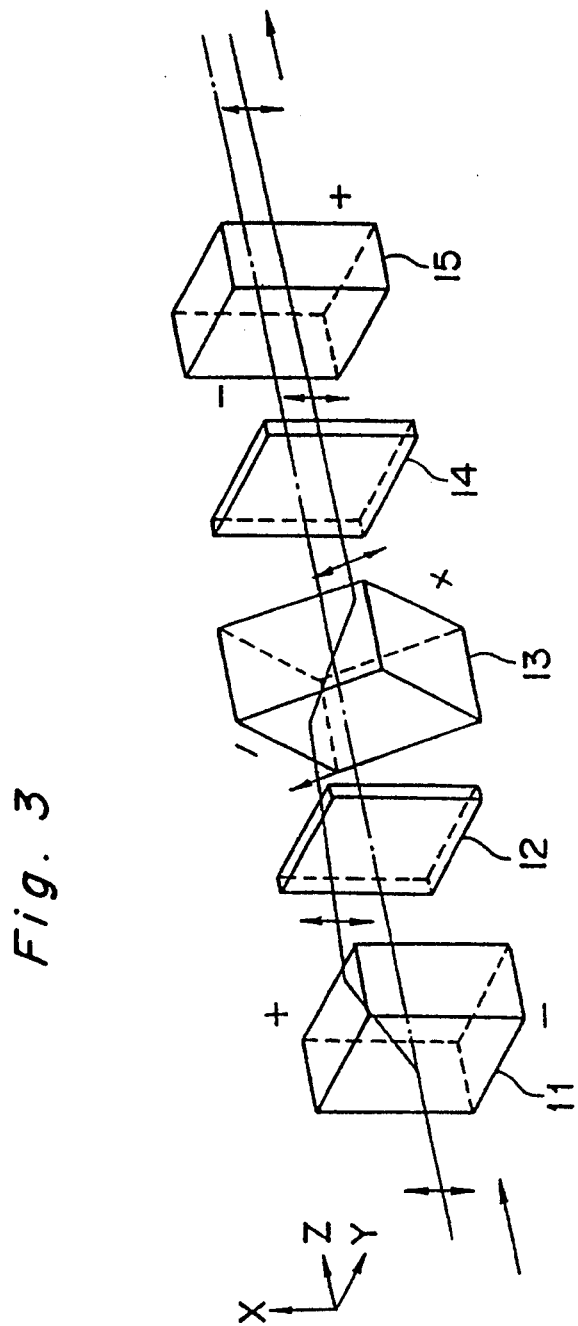
FIG. 3 is a perspective view showing the propagation state of an incident beam in a forward direction.
Figure 4:
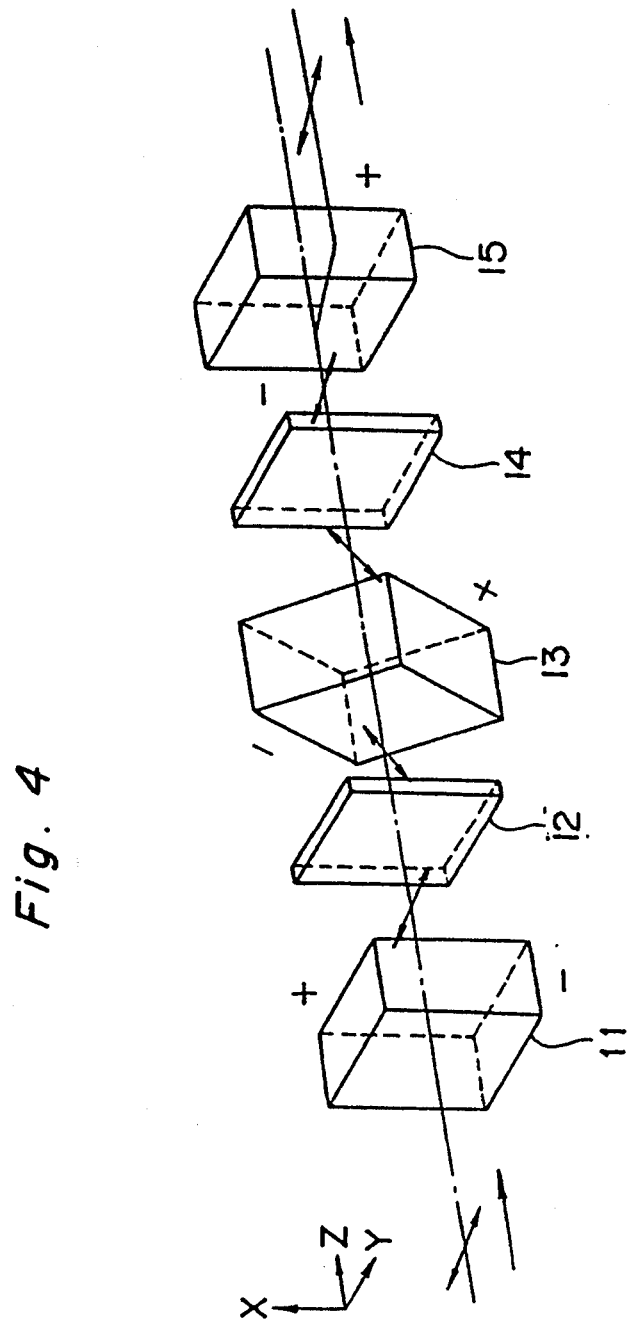
FIG. 4 is a perspective view showing the propagation state of an incident beam in a forward direction.

FIGS. 3 and 4 show the tracing of the transmission of the incident beam in the forward direction in the optical isolator of FIG. 1. FIG. 3 shows the case in which an incident beam having a plane of polarization in X-axis direction is incident on the optical isolator in the forward direction. Even though the plane of polarization is rotated 45° by the first Faraday rotor 12, it is rotated −45° by the second Faraday rotor 14 and as a result, the plane of polarization is returned to the original state. Therefore, the plane of polarization on the outgoing side is in the X-direction similarly to the plane of polarization of the incident beam. FIG. 4 shows the case in which an incident beam having a plane of polarization of Y-axis is incident on the optical isolator in the forward direction. Similarly to the case of FIG. 3, the plane of polarization of the outgoing side is in Y-axis direction similarly to the plane of polarization of the incident beam and thus the plane of polarization can be reliably kept. It is apparent that this property is established for all polarized beams.

Figure 5:
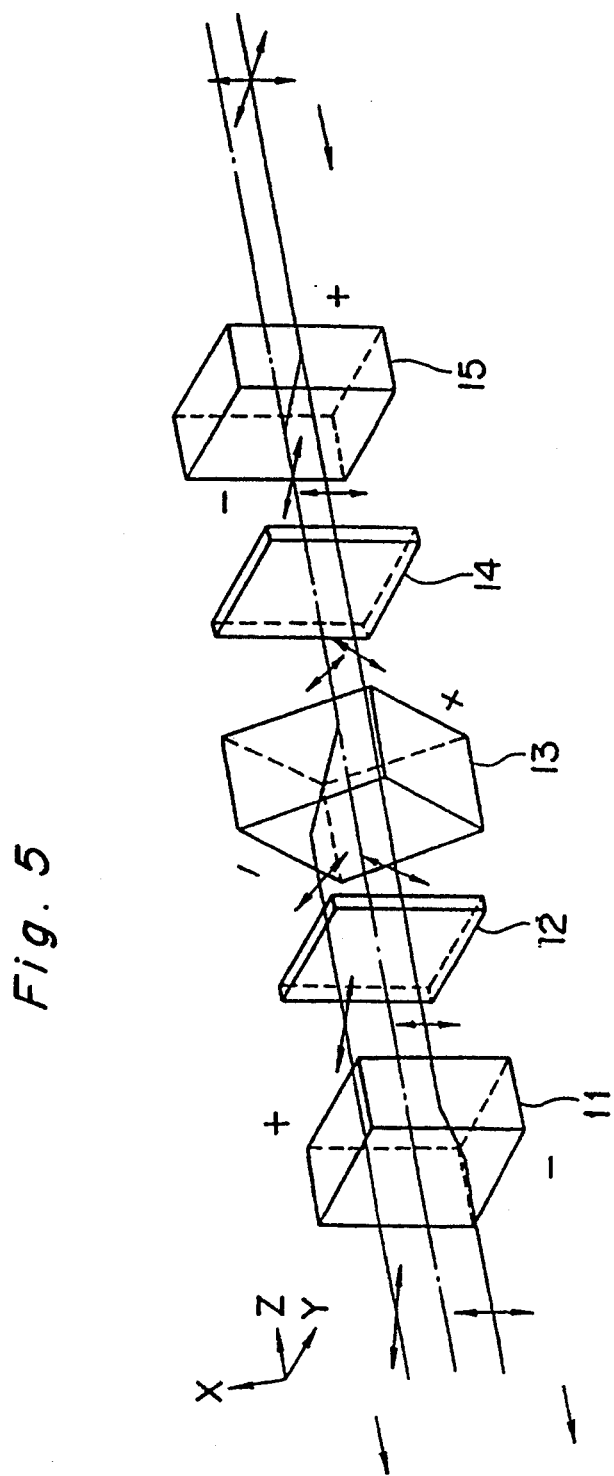
FIG. 5 is a perspective view showing the propagation state of an incident beam in a backward direction.
Figure 6:
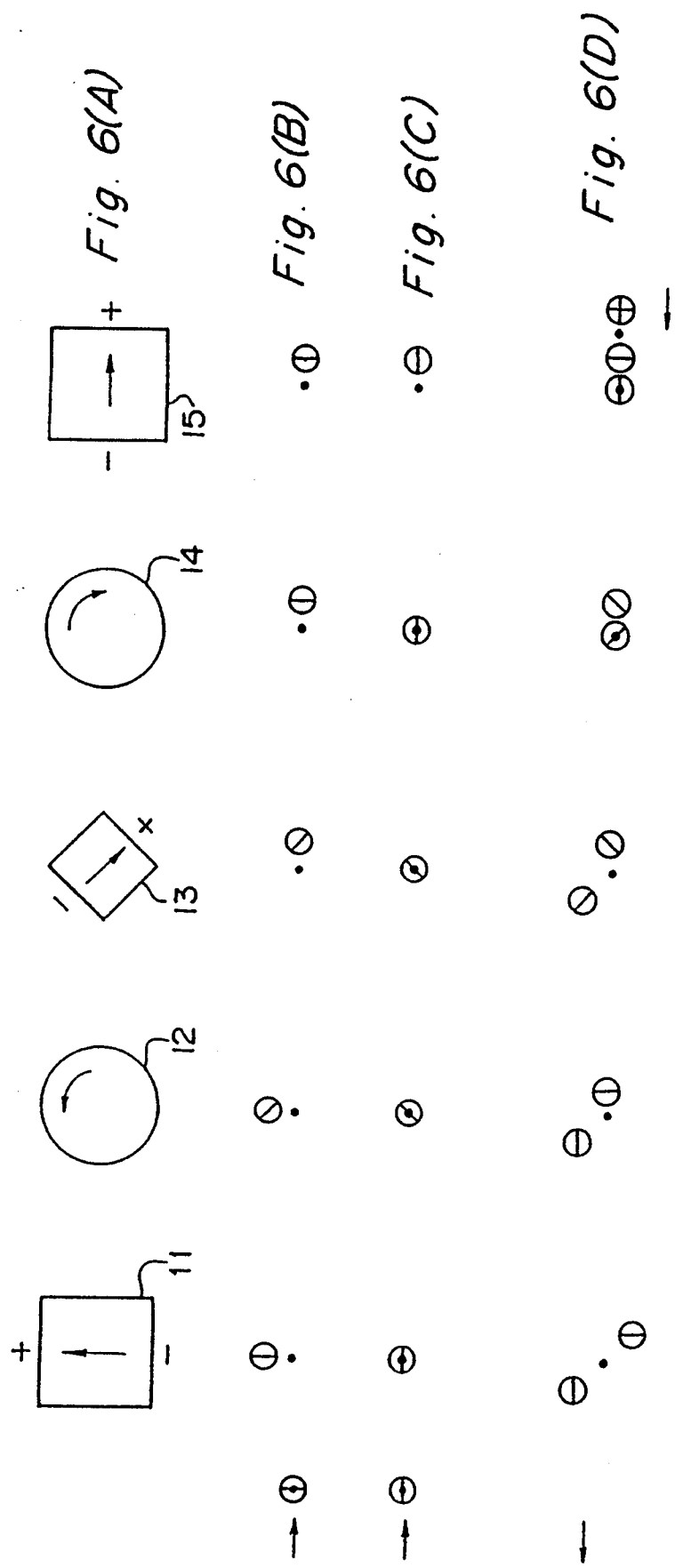
FIG. 6A-6D is a view showing the state of a light orbit corresponding to FIGS. 3 through 5.
Figure 7:
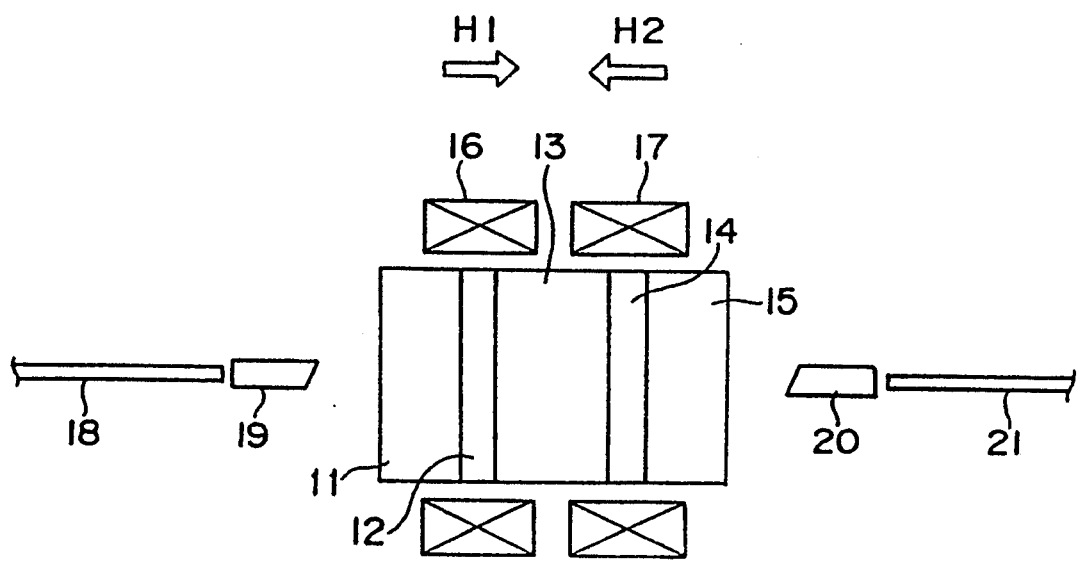
FIG. 7 is a schematic view showing the construction of an experiment according to the first embodiment of the present invention.

In the case of the backward direction, the polarization component of an ordinary beam and that of an extraordinary beam are separated from each other and deviate a certain distance (separation distance) from the center line and thus not connected with each other within the optical path of the incident side as shown in FIG. 5. That is, similarly to the conventional optical isolator, the separation width between the ordinary beam and the extraordinary beam is great and hence the polarization components thereof are not connected with each other on the center line on the outgoing side as well. FIG. 6A shows the position of the optical beam on the orbit of the beam and the state of the polarization direction observed at this time; FIG. 6B corresponds to FIG. 3; FIG. 6C corresponds to FIG. 4; and FIG. 6D corresponds to FIG. 5. An experiment according to the present invention will be described below with reference to FIG. 7. The thickness of the parallel plates 11, 13, and 15 consisting of rutile crystal serving as the double refractive crystal was 2 mm, 2.828 mm, and 2 mm, respectively. YIG monocrystal was used as the Faraday rotors 12 and 14, and the magnetization direction of the second permanent magnet 17 was provided to be opposite to that of the first permanent magnet 16 so that the second Faraday rotor 14 was capable of rotating the plane of polarization in the opposite direction. Constant polarization optical fibers of single mode type were used as optical fibers 18 and 21 disposed on the incident side and the outgoing side, respectively. Collimating lenses 19 and 20 were disposed between the leading end of the optical fiber 18 and the optical isolator and between the leading end of the optical fiber 21 and the optical isolator. Various polarized beams were incident on the optical isolator having the above-described construction from the optical fiber 18 and as a result, it was confirmed that the plane of polarizations (polarized surface) of the polarized beams did not change in the transmission thereof through the optical isolator. Evaluating the transmission characteristic, −1.5 dB was obtained as insertion loss in the forward direction and 56 dB was obtained as isolation (loss in backward direction, loss ratio) and thus it was confirmed that the optical isolator could be put to practical use.

As described above, according to the first embodiment, since a pair of Faraday rotors which rotate the plane of polarization in opposite directions are disposed between a plurality of parallel flat double refractive substances, the effect that the optical isolator does not depend on the plane of polarization of the incident beam and the plane of polarization does not change on the outgoing side. Accordingly, the use of the optical isolator according to the present invention between constant polarization optical fibers reduces the amount of the labor for rotation-adjustment with the beam direction of the optical fiber set as the axis, which provides profit such as the reduction of operation cost.

Second Embodiment

FIGS. 8 through 11 show a second embodiment of the present invention.

Figure 8:
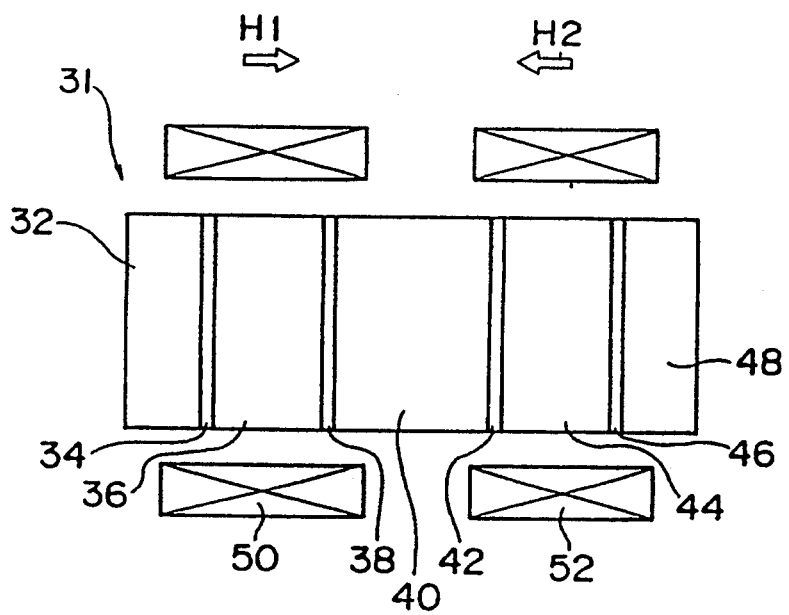
FIG. 8 is a view showing the schematic construction of an optical isolator according to a second embodiment of the present invention.

FIG. 8 shows a schematic construction of an optical isolator according to the second embodiment of the present invention. The optical isolator 31 comprises five parallel flat double refractive crystals 32, 36, 40, 44, and 48; four Faraday rotors 34, 38, 42, and 46 each interposed between the adjacent double refractive crystals; and permanent magnets 50 and 52 for magnetizing these Faraday rotors. The parallel flat double refractive crystals and the Faraday rotors are arranged in a straight line. Various double refractive substances such as a calcite plate or rutile can be utilized as the parallel flat double refractive crystals 32, 36, 40, 44, and 48. Various magnetic optical materials such as YIG (yttrium iron garnet) monocrystal, Bi-replaced garnet, RIG (rare-earth iron garnet) can be utilized as the Faraday rotors 34, 38, 42, and 46. As the permanent magnets 50 and 52, an annular permanent magnet consisting of such as SmCo can be utilized.

Figures 9A, 9B, 9C:
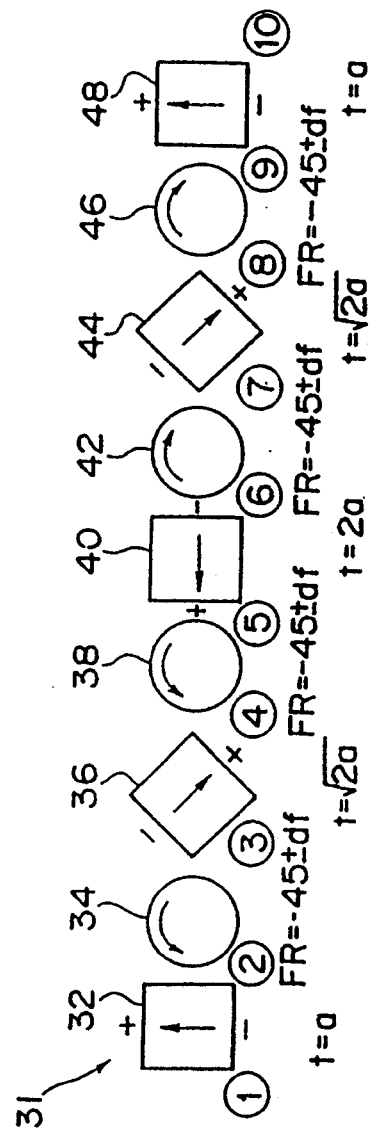
FIG. 9A-9C is a concept view showing the direction of the optical axis of a double refractive crystal constituting the optical isolator of FIG. 8, the rotational direction of the plane of polarization made by Faraday rotors, and the light orbit obtained by viewing the propagation state of an incident beam.

As shown in the upper row (A) of FIG. 9, the crystal optical axis of the first parallel flat double refractive crystal 32 disposed at the incident position in the forward direction forms approximately 45° with the surface thereof. The second parallel flat double refractive crystal 36 has a thickness ($\sqrt{2}a$) which is $\sqrt{2}$ times as great as the thickness (a) of the first parallel flat double refractive crystal 32 and has an optical axis (shown by an arrow of FIG. 9) rotated by 135° with respect to the optical axis of the first parallel flat double refractive crystal 32 about an axis perpendicular to its parallel flat surface. The third parallel flat double refractive crystal 40 has a thickness 2a which is 2 times as great as the thickness (a) of the first parallel flat double refractive crystal 32 and has an optical axis rotated by 270° with respect to the optical axis of the first parallel flat double refractive crystal 32 about an axis perpendicular to its parallel flat surface. The fourth parallel flat double refractive crystal 44 has the same thickness ($\sqrt{2}a$) as that of the second parallel flat double refractive crystal 36 and has a optical axis in the same direction as that of the second parallel flat double refractive crystal 36. The fifth parallel flat double refractive crystal 48 has the same thickness (a) as that of the first parallel flat double refractive crystal 32 and has a optical axis in the same direction as that of the first parallel flat double refractive crystal 32. That is, the thickness of the first through fifth parallel flat double refractive crystals 32, 36, 40, 44, and 48 is set at the ratio of 1:$\sqrt{2}$:2:$\sqrt{2}$:1 and direction of each of the optical axis thereof is set to 0°, 135°, 270°, 135°, and 0°.

The first and second Faraday rotors 34 and 38 are magnetized in the forward direction H1 by the permanent magnet 50 and rotate the plane of polarization of the beam by 45° while the third and fourth Faraday rotors 42 and 46 are magnetized in the backward direction H2 by the permanent magnet 52 and rotate the plane of polarization of the beam by −45°.

The middle row (B) and the lower row (C) of FIG. 9 show the tracing of the transmission of incident beams, thus showing the orbits of the incident beams as viewed from the direction thereof. The mark o of FIG. 9 shows beams and the difference in the optical intensity thereof is indicated by the difference of the area thereof. As shown in FIG. 9, even though the rotational angle of the plane of polarization rotated by each Faraday rotor deviates by df (or −df) from an ideal angle 45° (or −45°) due to the change in temperature and that of the wavelengths thereof, the entire error angle becomes approximately zero (−df−df+df+df=0) owing to offset. Therefore, the optical isolator 31 maintains a comparatively low insertion loss in the forward direction and a comparatively high isolation performance.

Figure 10:
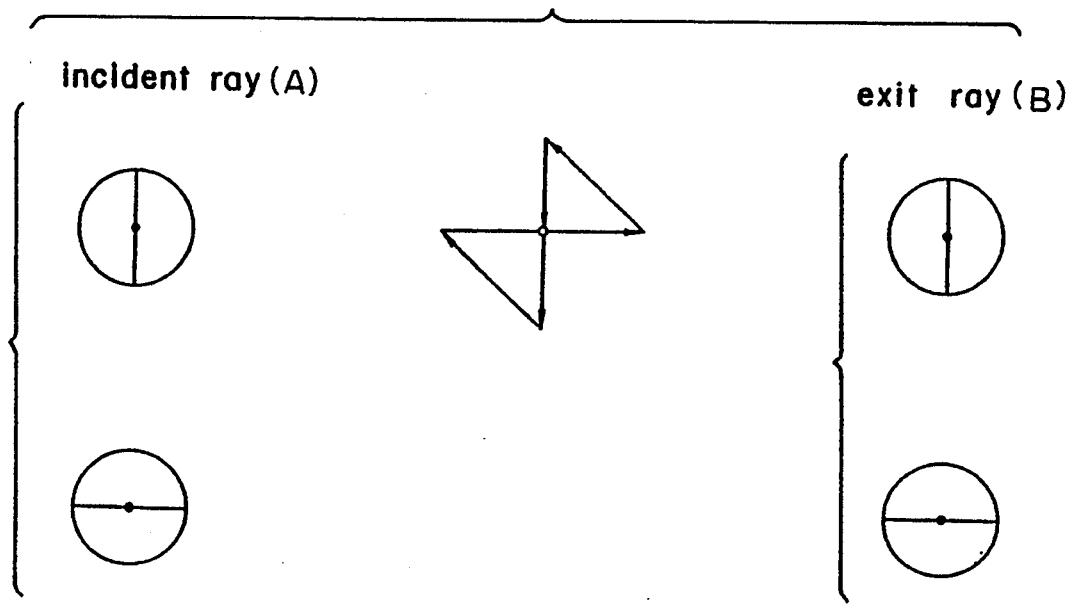
FIG. 10A and 10B is a concept view showing the position of the orbit of an incident beam and an outgoing beam in the forward direction in a forward point and a backward point of the optical isolator of FIG. 8.

As shown in FIG. 10 showing necessary portions extracted from FIG. 9, it is understood that an outgoing beam (B) is on the extension line of an incident beam (A) in the forward direction in the forward and backward portion of the optical isolator 31 irrespective of the directions of the plane of polarization.

Since the pair of the two Faraday rotors 34 and 38 and the pair of the two Faraday rotors 42 and 46 rotate the plane of polarization in directions opposite to each other, the plane of polarization of the beam can be maintained even after the beam transmits the optical isolator 31.

Figure 11:
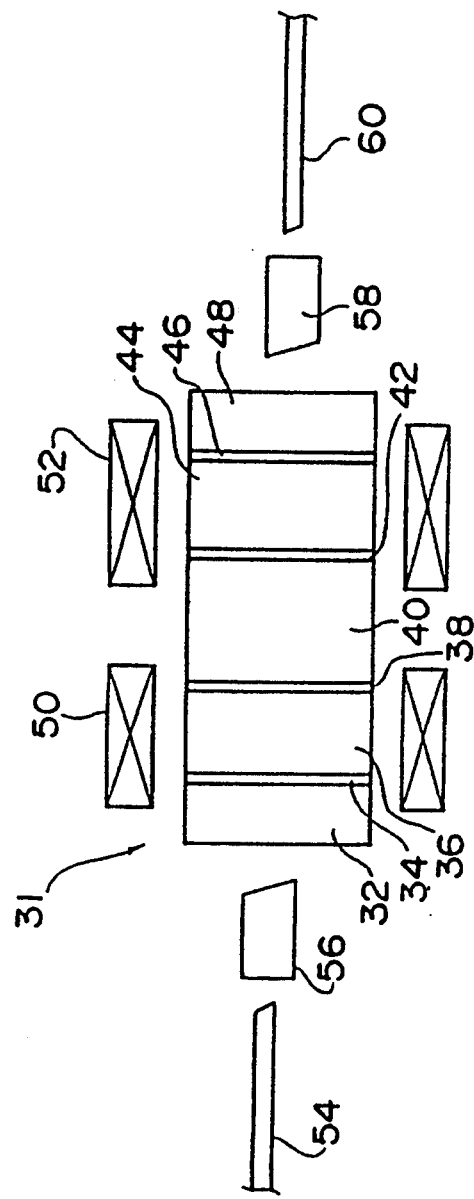
FIG. 11 is a schematic view showing the construction of an experiment according to the second embodiment of the present invention.

Another experiment according to the present invention will be described below with reference to FIG. 11. As the parallel flat double refractive crystals 32, 36, 40, 44, and 48, a parallel flat plate of rutile crystal was used and the thickness thereof was 1.6 mm, 2.263 mm, 3.2 mm, 2.623 mm, and 1.6 mm, respectively. YIG monocrystal was used as the Faraday rotors 34 and 38 for rotating the plane of polarization by 45°, and (GdLuBi) IG monocrystal was used as the Faraday rotors 42 and 46 for rotating the plane of polarization by −45°. Microlenses 56 and 58 were provided between an optical fiber 54 of single mode type and the optical isolator 31 and between an optical fiber 60 of single mode type and the optical isolator 31.

In the above-described construction, a beam of single mode was incident on the optical isolator 31 from the optical fiber 54 disposed on the incident side and it was confirmed that the outgoing beam and the incident beam were on the same line. Evaluating the transmission characteristic, −2.0 dB was obtained as insertion loss in the forward direction and 65 dB was obtained as isolation (loss in backward direction) and thus it was confirmed that the optical isolator could be put to practical use. It was also confirmed that isolation performance was maintained in the approximately same degree until approximately 40° C. Various polarized beams were incident on the optical isolator 31 from optical fiber 54 and it was confirmed that each plane of polarization did not change even after each beam transmitted the optical isolator 31.

Since the incident beam and the outgoing beam were substantially on the same line, the position of the lenses 56 and 58 and those of the optical fibers 54 and 60 could be adjusted in a comparatively small range and the optical circuit can be assembled in a short period of time.

As described above, the optical isolator of the second embodiment does not depend on the directions of the plane of polarization and is hardly affected by the change in temperature and the wavelength of light. In addition, the incident beam and the outgoing beam are coincident with each other on the same line. Therefore, according to the second embodiment, it is unnecessary to carry out an accurate adjustment of optical axes in inserting the optical isolator of the present invention into an optical circuit.

Third Embodiment

FIGS. 12 through 21 show a third embodiment of the present invention.

Figure 12:
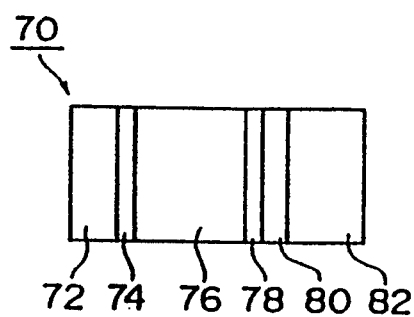
FIG. 12 is a view showing the schematic construction of an optical isolator according to a third embodiment of the present invention.

FIG. 12 shows the schematic construction of an optical isolator according to the third embodiment of the present invention. The optical isolator 70 comprises four parallel flat double refractive crystal 72, 76, 80, and 82; two Faraday rotors 74 and 78; and a permanent magnet 84 for magnetizing the Faraday rotors 74 and 78. The first Faraday rotor 74 is interposed between the first and second parallel flat double refractive crystals 72 and 76, and the second Faraday rotor 78 is interposed between the second and third parallel flat double refractive crystals 76 and 80. The Faraday rotor 74 and 78 rotate the plane of polarization by 45° counterclockwise. As the parallel flat double refractive crystals 72, 76, 80, and 82, various double refractive crystal substances such as a calcite plate or rutile can be utilized. As the Faraday rotors 74 and 78, various magnetic optical materials such as YIG (yttrium iron garnet) monocrystal, Bi-replaced garnet and RIG (rare-earth iron garnet) can be utilized. As the permanent magnet, an annular permanent magnet consisting of such as SmCo can be utilized.

Figures 13A, 13B, 13C:
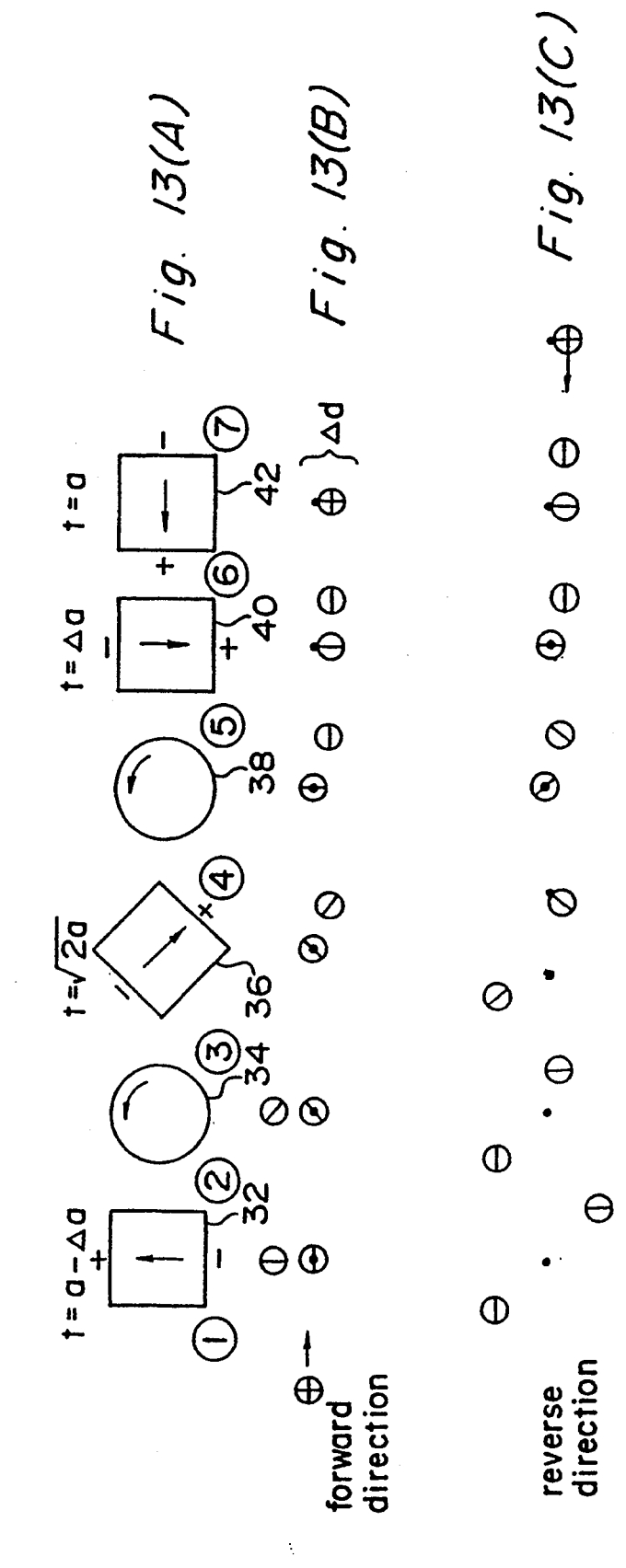

As shown in FIG. 13A, the thickness (t) of the first through fourth parallel flat double refractive crystals 72, 76, 80, and 82 is $a - \Delta a$, $\sqrt{2}a$, $\Delta a$, and $a$, respectively and the orientation of the optical axis of each crystal is 0°, 135°, 180°, and 270°, respectively. In this manner, the thickness of the first parallel flat double refractive crystal 72 disposed at the end of the incident side of a beam is reduced by a predetermined thickness $-\Delta a$, and there is additionally provided the third parallel flat double refractive crystal 80 having the thickness of $\Delta a$ and having an optical axis which is same as the first parallel flat double refractive crystal 72 in the direction and opposed thereto in the orientation thereof.

Figure 14:
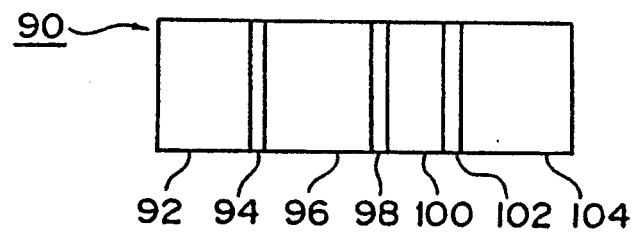
FIG. 14 is a view showing the schematic construction of an optical isolator according to a first modification of the third embodiment of the present invention.

FIG. 14 shows the schematic construction of an optical isolator according to a first modification of the third embodiment of the present invention. The optical isolator 90 comprises four parallel flat double refractive crystal 92, 96, 100, and 104; three Faraday rotors 94, 98, and 102; and the permanent magnet 84 for magnetizing the Faraday rotors 94 and 98. Each of the Faraday rotors 94, 98, and 102 is interposed between the two adjacent parallel flat double refractive crystals and rotates the plane of polarization by 45° in the same direction. As shown in FIG. 15A, the thickness (t) of the first through fourth parallel flat double refractive crystal 92, 96, 100, and 104 is $a + \Delta a$, $\sqrt{2}a$, $a - \Delta a$, and $\sqrt{2}a$, respectively and the orientation of the optical axis of each crystal is 0°, 135°, 180°, and 225°. In this example, the thickness of the first and third parallel flat double refractive crystals 92 and 98 having an optical axis which is in the same direction and opposed to each other in the orientation thereof is changed by $\Delta a$ and $-\Delta a$ from (a), respectively.

The operation of the optical isolators 70 according to the third embodiment and the optical isolator 90 of the modification 1 having the above-described construction are described below.

Figure 18:
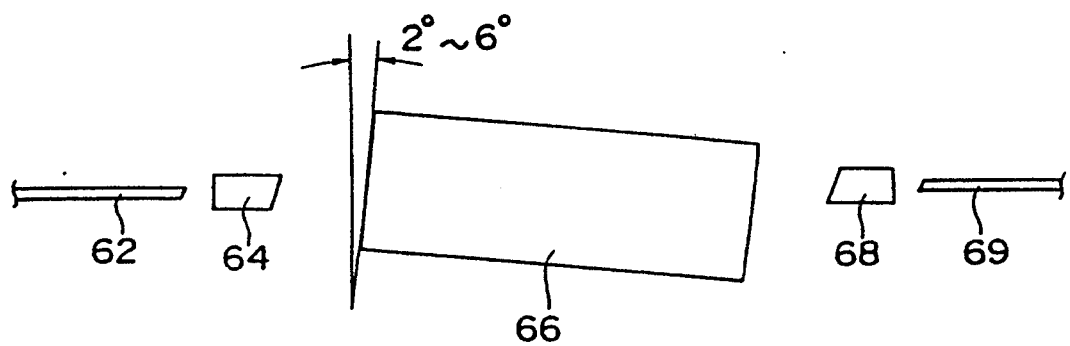
FIG. 18 is a schematic view showing a general arrangement relationship between an optical isolator and an optical fiber.
Figure 19:
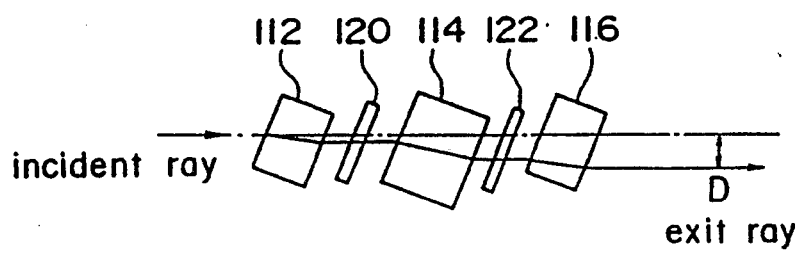
FIG. 19 is a view, of an optical path, showing an example of the change of an outgoing beam with respect to an incident beam in the forward direction in an optical isolator.
Figure 20:
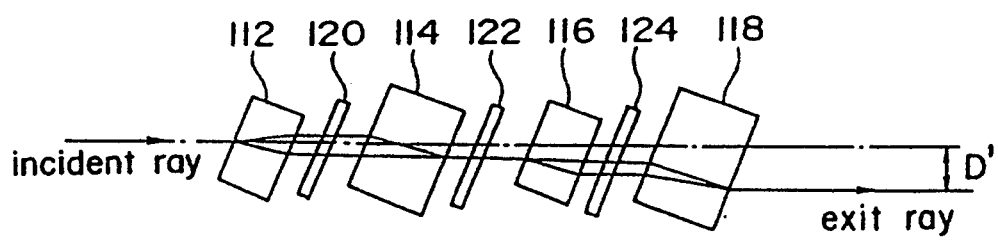
FIG. 20 is a view, of an optical path, showing another example of the change of an outgoing beam with respect to an incident beam in the forward direction in an optical isolator.
Figure 23:
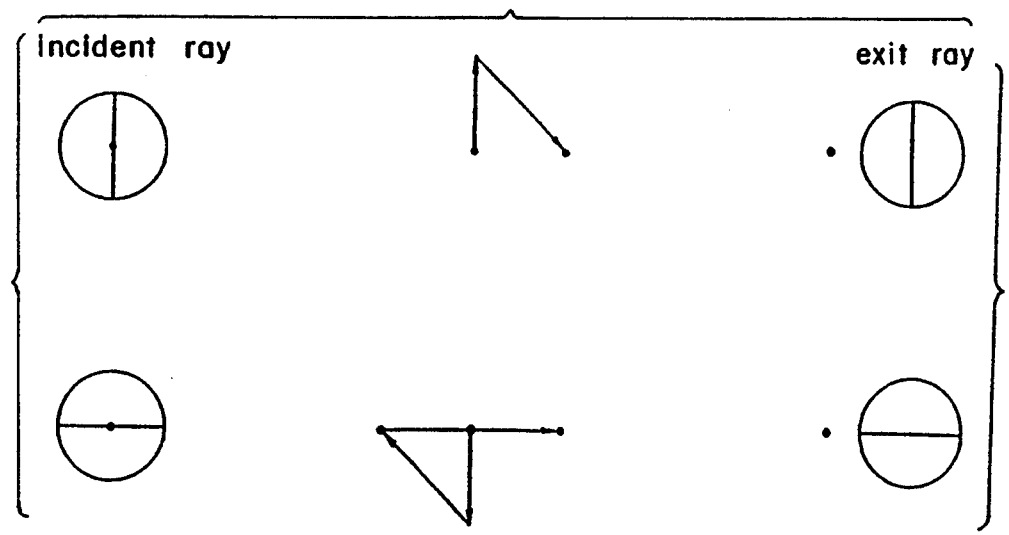
FIG. 23 is a concept view showing the position of an orbit of an incident beam and an outgoing beam in the forward direction in a forward point and a backward point of the conventional optical isolator.

Normally, the main body of the optical isolator is disposed not perpendicular to the direction of a beam but forms 2° to 6° therewith as shown in FIG. 18 so as to prevent beams reflected by the main body of the optical isolator from being incident thereon. FIG. 19 shows an example of the optical isolator and FIG. 20 shows another example thereof. Reference numeral 62 of FIG. 18 denotes an optical fiber on the incident side; 64 denotes a collimating lens on the incident side; 66 denotes the main body of the optical isolator; 68 denotes a collimating lens on the outgoing side; and 69 denotes an optical fiber on the outgoing side. Reference numerals 112, 114, 116, and 118 denote a parallel flat double refractive crystal (double refractive substances), respectively and 120, 122, and 124 denote a Faraday rotor, respectively. FIG. 21 shows a detailed construction of the optical isolator of FIG. 20 and the transmission state of an incident beam.

The main factors causing the deviation in the orbit of the incident beam are a refraction caused by the disposition of parallel flat double refractive crystals and that of Faraday rotors which form a certain angle with a line perpendicular to the direction of the beam and a refraction caused by the double refractive crystal itself. The deviation which occurs owing to the refraction caused by the former is expressed by (D) and (D') as shown in FIGS. 19 and 20, respectively. The deviation which occurs owing to the refraction caused by the latter is expressed by (d) as shown in FIG. 21. Accordingly, the condition required for a beam which have left the optical isolator to be in the vicinity of the extension line of the incident beam is expressed by the following equation (1):

$$(D+d\approx 0) \tag{1}$$

In the above equation, (D) is determined from an inclination with respect to a line perpendicular to the direction of the incident beam and (d) is determined according to a desired isolation performance. Therefore, the optical isolator having the conventional construction does not satisfy the equation (1) as described previously.

In the optical isolator according to the third embodiment having the construction as shown in FIGS. 12 through 15, (d) of the equation (1) can be changed to approximately the value of $(-D)$ by varying the thickness of the thickness-adjusting $\Delta a$ to an appropriate value. Therefore, the beam which has gone out from the optical isolator 70 (or 50) can be disposed in the vicinity of the extension line of the incident beam by adjusting the thickness $\Delta a$ of the respective parallel flat double refractive crystals 72 and 80 (or 92 and 100) to a predetermined value in advance so as to satisfy the equation (1).

At this time, as FIGS. 13C and 14C indicate, the separation width of the beam in the backward direction is not different from the case in which $\Delta a=0$ and a favorable isolation performance can be obtained similarly to the conventional art.

An experiment according to the third embodiment will be described with reference to FIGS. 16 and 17.

Figure 16:
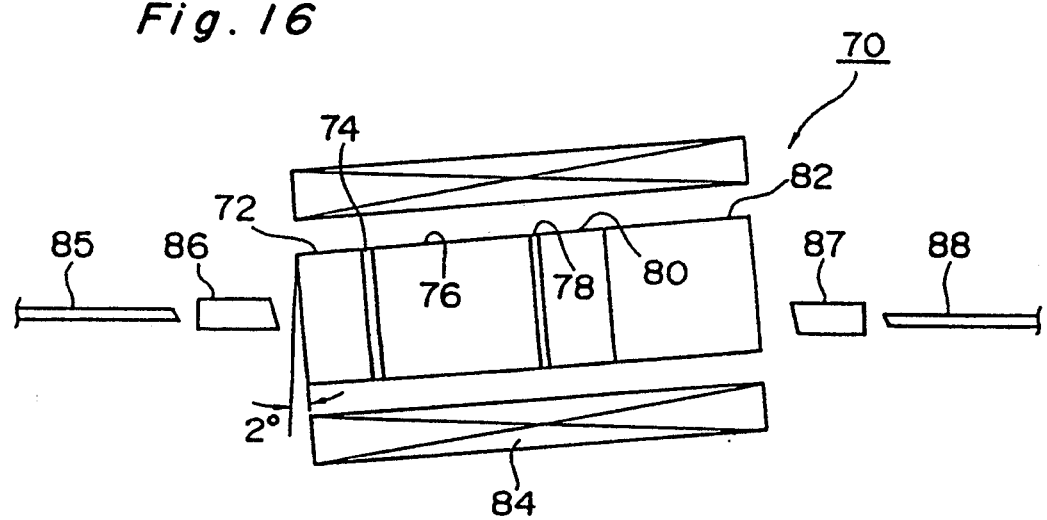
FIG. 16 is a view showing the schematic arrangement and construction of an optical isolator according to a first experiment of the third embodiment of the present invention.

FIG. 16 shows the construction of the experiment in which as the main body of an optical isolator, the optical isolator 70 according to the third embodiment shown in FIGS. 12 and 13 is used. In this experiment, $a=2$ mm, $\Delta a=1$ mm, and rutile crystal was used as the double refractive crystal. That is, the thickness of each of the parallel flat plates 72, 76, 80, and 82 of rutile was 1 mm, 2.828 mm, 2 mm, and 1 mm. YIG Faraday rotors were used as the Faraday rotors 74 and 78 and the cylindrical permanent magnet 84 was installed to cover the periphery of these Faraday rotors. The optical isolator 70 having such a construction was disposed between optical fibers 85 and 88 by inclining the optical isolator 70 by 2°, and SELFOC microlenses (trade name) 86 and 87 which were rod lenses of refractive index distribution type were interposed as collimating lenses between the optical fiber 85 and the optical isolator 70 and between the optical fiber 88 and the optical isolator 70.

Since the refractive index of the rutile crystal is 2.6, the deviation (D) of the beam orbit is estimated as approximately 90 μm according to the following equation (2) when the parallel plates 72, 76, 80, and 82 of rutile are inclined by 2°.

$$D=6.4 \tan (\sin 2°/2.6)=0.086 \text{ mm} \tag{2}$$

When 1 mm is adopted as the value of $\Delta a$ in the construction of FIG. 16, the deviation in the forward direction shown in FIG. 13B is as follows: $\Delta d=-76$ μm. The following equation (3) is obtained by disposing the optical isolator 70 by paying attention to the deviation direction:

$$D+d \approx 10 \text{ μm} \tag{3}$$

Figure 17:
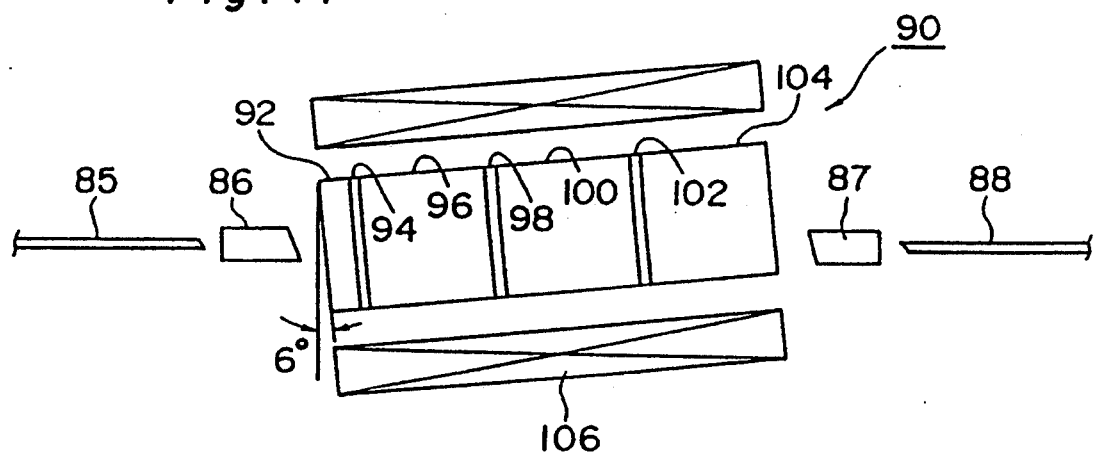
FIG. 17 is a view showing the schematic arrangement and construction of an optical isolator according to a second experiment of the third embodiment of the present invention.

FIG. 17 shows an optical isolator of a second experiment in which the optical isolator 90 having the construction of the optical isolator 90 of the first modification shown in FIGS. 14 and 15 is used. In this experiment, $a=\sqrt{2}$ mm, $\Delta a=-1$ mm, and rutile crystal was used as the double refractive crystal. That is, the thickness of each of the parallel flat plates 92, 96, 100, and 104 of rutile was 0.414 mm, 2 mm, 2.414 mm, and 2 mm, respectively. YIG Faraday rotors were used as the Faraday rotors 94, 98, and 102, and the cylindrical permanent magnet 84 was installed to cover the periphery of these Faraday rotors. The optical isolator 90 having such a construction was disposed between the optical fibers 85 and 88 by inclining the optical isolator 70 by 6°, and the SELFOC microlenses (trade name) 86 and 87, namely, rod lenses of refractive index distribution type were interposed as collimating lenses between the optical fiber 85 and the optical isolator and between the optical fiber 88 and the optical isolator. The refractive index of the rutile crystal was 2.6 as described above. In consideration of the thickness of the parallel flat plates 72, 76, 80, and 82 of rutile, the deviation amount $(d-\Delta d)$ of the beam which has left the optical isolator is approximately 227 μm: 303 μm$-$76 μm$=$227 μm (refer to FIG. 15B.) The deviation (D) of the beam orbit is estimated as approximately 260 μm according to the following equation (4) when the parallel plates 72, 76, 80, and 82 of rutile is inclined by 6°:

$$D=9.1 \tan (\sin 6°/2.6)=0.257 \text{ mm} \tag{4}$$

Since the deviation amount $d-\Delta d$ of the beam which has left the optical isolator is approximately equal to the deviation (D) of the beam orbit, the beam which has left the optical isolator can be disposed substantially on the extension line of the incident beam.

As described above, according to the third present invention, the thickness of a pair of the parallel flat double refractive crystals is changed by $\Delta a$ and $-\Delta a$ or the thicknesses of the four parallel flat double refractive crystals are changed by $-\Delta a$ and at the same time, the parallel flat double refractive crystal having the thickness of $\Delta a$ is additionally provided so that the orbit of the beam which has left the optical isolator is changed by $\Delta d$. Thus, the beam which has left the optical isolator can be disposed substantially on the extension line of the incident beam. Therefore, according to the third embodiment, the axis-adjusting range of the collimating lens and that of the optical fiber can be reduced and thus, the optical circuit can be assembled in a short period of time, which contributes to the cost reduction of a product.

What is claimed is:

1. An optical isolator comprising:
   a first parallel flat double refractive crystal having a crystal optical axis and a thickness of $a-\Delta a$, wherein a is a predetermined thickness;
   a first Faraday rotor for rotating the plane of polarization of a beam;
   a second parallel flat double refractive crystal having a crystal optical axis and a thickness of $\sqrt{2}a$;
   a second Faraday rotor for rotating the plane of polarization of a beam;

a third parallel flat double refractive crystal having a crystal optical axis and a thickness of Δa;

a fourth parallel flat double refractive crystal having a crystal optical axis and a thickness of a; and at least one permanent magnet for magnetizing said first and second Faraday rotors;

wherein Δa is determined to satisfy the condition that a beam emitted from said optical isolator is coincident with an axial direction of an incident beam entering said first parallel flat double refractive crystal of said optical isolator.

* * * * *